US007727063B2

(12) United States Patent
Walker et al.

(10) Patent No.: US 7,727,063 B2
(45) Date of Patent: *Jun. 1, 2010

(54) METHODS AND APPARATUS FOR LOTTERY GAME PLAY AGGREGATION

(75) Inventors: Jay S. Walker, Ridgefield, CT (US); James A. Jorasch, New York, NY (US); Magdalena M. Fincham, Ridgefield, CT (US); Stephen C. Tulley, Fairfield, CT (US); John M. Packes, Hawthorne, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/424,598

(22) Filed: Jun. 16, 2006

(65) Prior Publication Data

US 2006/0247008 A1 Nov. 2, 2006

Related U.S. Application Data

(63) Continuation of application No. 10/914,690, filed on Aug. 9, 2004, now Pat. No. 7,582,012, which is a continuation-in-part of application No. 09/938,977, filed on Aug. 24, 2001, now Pat. No. 6,773,345.

(60) Provisional application No. 60/228,144, filed on Aug. 25, 2000.

(51) Int. Cl.
*G06F 17/00* (2006.01)
*G06F 19/00* (2006.01)

(52) U.S. Cl. ............................ 463/17; 463/16; 463/18; 463/19; 463/20; 273/139; 273/269; 283/901; 283/903

(58) Field of Classification Search ............ 463/16–20; 273/139, 269; 283/901, 903
See application file for complete search history.

(56) References Cited

U.S. PATENT DOCUMENTS 4,184,683 A 1/1980 Hooker .................. 273/143 R (Continued)

FOREIGN PATENT DOCUMENTS

DE 19631 052 A1 2/1997

(Continued)

OTHER PUBLICATIONS

"President Riverboat Casino First to Boast Over $1 Million Hand Pay Out" to Slot Jackpot Winners, PR Newswire, Jun. 6, 1991, Section: Lifestyle, 2pp.

(Continued)

*Primary Examiner*—Peter DungBa Vo
*Assistant Examiner*—Milap Shah
(74) *Attorney, Agent, or Firm*—Fincham Downs LLC

(57) ABSTRACT

According to one embodiment, a player may accumulate occurrences of a bonus symbol over at least two outcomes. The player may be allowed a bonus if a running count of the occurrences is at least equal to a predetermined number. According to another embodiment, a player may accumulate occurrences of matched lottery numbers over a plurality of lottery outcomes (e.g., lottery number drawings) and/or a plurality of lottery entries. The player may be allowed a bonus if a running count of occurrences of matched numbers is at least equal to a predetermined number.

10 Claims, 12 Drawing Sheets

U.S. PATENT DOCUMENTS 4,398,708 A 8/1983 Goldman et al. .............. 270/18
4,448,419 A 5/1984 Telnaes
4,570,934 A 2/1986 Smyth .................... 273/143 R
4,582,324 A 4/1986 Koza et al. .............. 273/138 A
4,669,731 A 6/1987 Clarke ................... 273/143 R
4,679,143 A 7/1987 Hagiwara
4,695,053 A 9/1987 Vazquez, Jr.
4,760,245 A 7/1988 Fukaya
4,775,155 A 10/1988 Lees .......................... 273/139
4,842,278 A 6/1989 Markowicz ............. 273/138 A
4,856,787 A 8/1989 Itkis ........................... 273/237
4,939,705 A 7/1990 Hamilton et al. .............. 368/10
4,991,848 A 2/1991 Greenwood
5,083,271 A 1/1992 Thacher et al. ............. 364/411
5,085,436 A 2/1992 Bennett .................. 273/143 R
5,108,099 A 4/1992 Smyth .................... 273/138 A
5,116,049 A 5/1992 Sludikoff et al.
5,116,055 A 5/1992 Tracy ..................... 273/138 A
5,123,649 A 6/1992 Tiberio ................... 273/143 R
5,129,652 A 7/1992 Wilkinson .................. 273/139
5,158,293 A 10/1992 Mullins ...................... 273/139
5,178,390 A 1/1993 Okada .................... 273/143 R
5,179,517 A 1/1993 Sarbin et al. ................ 364/410
5,232,221 A 8/1993 Sludikoff et al.
5,242,163 A 9/1993 Fulton .................... 273/85 CP
5,259,616 A 11/1993 Bergmann
5,275,400 A 1/1994 Weingardt
5,276,312 A 1/1994 McCarthy ................... 235/380
5,277,424 A 1/1994 Wilms
5,287,269 A 2/1994 Dorrough et al. ........... 364/408
5,297,205 A 3/1994 Audebert et al. .............. 380/23
5,317,135 A 5/1994 Finocchio ................... 235/375
5,327,485 A 7/1994 Leaden ........................ 379/95
5,342,047 A 8/1994 Heidel et al. ............ 273/85 CP
5,356,140 A 10/1994 Dabrowski et al.
5,370,399 A 12/1994 Liverance ................... 273/434
5,393,057 A 2/1995 Marnell, II .............. 273/85 CP
5,393,061 A 2/1995 Manship et al. ......... 273/143 R
5,401,023 A 3/1995 Wood
5,409,225 A 4/1995 Kelly et al. ............. 273/138 R
5,449,173 A 9/1995 Thomas et al. .......... 273/143 R
5,494,287 A 2/1996 Manz
5,499,816 A 3/1996 Levy .......................... 273/139
5,511,784 A 4/1996 Furry
5,544,892 A 8/1996 Breeding
5,559,312 A 9/1996 Lucero ....................... 235/380
5,564,700 A 10/1996 Celona ........................ 463/27
5,575,717 A 11/1996 Houriet, Jr. et al. ............ 463/1
5,580,309 A 12/1996 Piechowiak et al. ........... 463/16
5,586,766 A 12/1996 Forte et al.
5,603,502 A 2/1997 Nakagawa
5,611,730 A 3/1997 Weiss .......................... 463/20
5,613,680 A 3/1997 Groves et al. ............ 273/138.2
5,632,681 A 5/1997 Bakoglu et al. ............... 463/44
5,639,088 A 6/1997 Schneider et al. ........ 273/138.2
5,655,961 A 8/1997 Acres et al. ................... 463/27
5,695,400 A 12/1997 Fennell et al.
5,695,402 A 12/1997 Stupak ........................ 463/20
5,697,843 A 12/1997 Manship et al. ............... 463/20
5,702,304 A 12/1997 Acres et al. ................... 463/29
5,704,835 A 1/1998 Dietz, II ...................... 463/20
5,709,603 A 1/1998 Kaye ........................... 463/17
5,720,662 A 2/1998 Holmes, Jr. et al. ........... 463/20
5,722,891 A 3/1998 Inoue .......................... 463/20
5,741,183 A 4/1998 Acres et al. ................... 463/42
5,755,621 A 5/1998 Marks et al.
5,761,647 A 6/1998 Boushy
5,770,533 A 6/1998 Franchi
5,787,156 A 7/1998 Katz ....................... 379/93.13
5,791,990 A 8/1998 Schroeder et al. ............. 463/17
5,800,264 A 9/1998 Pascal et al. .................. 463/16
5,811,772 A 9/1998 Lucero
5,816,918 A 10/1998 Kelly et al. ................... 463/16
5,823,879 A 10/1998 Goldberg et al.
5,833,537 A 11/1998 Barrie
5,833,538 A 11/1998 Weiss .......................... 463/21
5,833,540 A 11/1998 Miodunski et al. ............ 463/42
5,836,586 A 11/1998 Marks et al.
5,848,932 A 12/1998 Adams ........................ 463/20
5,851,147 A 12/1998 Stupak
5,855,514 A * 1/1999 Kamille ....................... 463/17
5,871,398 A 2/1999 Schneier et al. ............... 463/16
5,882,260 A 3/1999 Marks et al.
5,885,158 A 3/1999 Torango et al. ............... 463/27
5,910,048 A 6/1999 Feinberg ...................... 463/25
5,931,467 A * 8/1999 Kamille ...................... 273/139
5,935,001 A 8/1999 Baba
5,959,277 A 9/1999 Lucero ....................... 235/380
5,979,702 A 11/1999 Hennessey et al. .......... 221/206
5,979,894 A 11/1999 Alexoff
5,980,384 A 11/1999 Barrie ......................... 463/16
5,996,997 A * 12/1999 Kamille ...................... 273/139
5,997,401 A 12/1999 Crawford ..................... 463/20
6,004,207 A 12/1999 Wilson, Jr. et al. ............ 463/20
6,007,426 A 12/1999 Kelly et al. ................... 463/16
6,016,338 A 1/2000 Bansal et al. ............ 379/93.13
6,017,032 A 1/2000 Grippo et al. ............ 273/138.1
6,019,374 A 2/2000 Breeding
6,024,640 A 2/2000 Walker et al. ................. 463/17
6,033,306 A 3/2000 De Souza .................... 463/18
6,033,307 A 3/2000 Vancura ....................... 463/20
6,039,648 A 3/2000 Guinn et al.
6,050,895 A 4/2000 Luciano, Jr. et al. ........... 463/7
6,053,813 A 4/2000 Mathis
6,068,552 A 5/2000 Walker et al. ................. 463/21
6,077,162 A 6/2000 Weiss .......................... 463/26
6,077,163 A 6/2000 Walker et al. ................. 463/26
6,089,975 A 7/2000 Dunn
6,093,100 A 7/2000 Singer
6,104,815 A 8/2000 Alcorn et al. ............... 380/251
6,113,102 A 9/2000 Marks et al.
6,135,882 A 10/2000 Kadlic
6,135,884 A 10/2000 Hedrick et al. ................ 463/20
6,142,872 A 11/2000 Walker et al. ................. 463/16
6,165,071 A 12/2000 Weiss
6,203,011 B1 3/2001 Nulph ..................... 273/138.2
6,203,430 B1 3/2001 Walker et al. ................. 463/20
6,237,913 B1 * 5/2001 Kamille ...................... 273/139
6,264,560 B1 7/2001 Goldberg et al.
6,280,328 B1 8/2001 Holch et al. .................. 463/42
6,287,202 B1 9/2001 Pascal et al.
6,290,603 B1 9/2001 Luciano, Jr. ................. 463/25
6,311,976 B1 11/2001 Yoseloff et al. .......... 273/138.2
6,312,332 B1 11/2001 Walker et al. ................. 463/23
6,364,765 B1 4/2002 Walker et al. ................. 463/16
6,533,273 B2 * 3/2003 Cole et al. ............... 273/138.1
6,568,680 B1 5/2003 Moody et al.
6,572,106 B2 6/2003 Alexoff
6,616,531 B1 * 9/2003 Mullins ....................... 463/19
6,793,219 B2 9/2004 Higginson .................. 273/269
6,857,958 B2 * 2/2005 Osawa ......................... 463/20
6,874,783 B2 4/2005 Higginson .................. 273/269
2001/0040341 A1 * 11/2001 Kamille ................... 273/138.1
2002/0084584 A1 * 7/2002 Yusuf ...................... 273/138.1
2004/0162134 A1 8/2004 Walker et al.
2005/0003884 A1 1/2005 Meyer et al. .................. 463/17

FOREIGN PATENT DOCUMENTS

EP 0 307 925 A2 3/1989
EP 0 898 253 A2 2/1999
EP 0 907 136 A1 4/1999
GB 2 161 008 A 1/1989
WO WO 96/08295 3/1996

| | | | |
|---|---|---|---|
| WO | WO 98/19280 | | 5/1998 |
| WO | WO 98/55191 | | 12/1998 |
| WO | WO 99/04873 | | 2/1999 |
| WO | WO 99/26204 | | 5/1999 |
| WO | WO 2005/079242 | A2 | 9/2005 |

OTHER PUBLICATIONS

"Video of wining moments in Pennsylvania sports history produced exclusively for Pennsylvania Lottery", Business Wire, May 7, 1992, 1pg.
"Scientific Games announces new board member", Business Wire, Dec. 5, 1994, 2pp.
Brochure: "Power-Play Slots", Jan. 1997, (http //www softsite com/ulti/), 13pp.
"Innovative Gaming Announces Nevada Approval of IGT Joint Venture Game-Bonus Streak", PR Newswire, May 14, 1997, Section: Financial News, 2pp.
Peterson, Ivars, "Computer triumphs over human champion; IBM chess computer Big Blue defeats Garry Kasparov", Science News, May 17, 1997, Section: No. 20, vol. 151, p. 300, ISSN: 0036-8423, 2pp.
Poole, David, "Letter from Charlotte: Vegas perfect for racing", Las Vegas Review-Journal, Jun. 22, 1997, Section: C, p. 2C, 2pp.
Cook, Melissa, "The Best New Slots", Casino Player, Apr. 1998, p. 44, 6pp.
Grochowski, John, "Royal is worth taking a risk", Chicago Sun-Times, Apr. 5, 1998, Section: Sho, Casinos, p. 18, NC, 3pp.
Green, Marian, "A horde of innovative suppliers is nipping at IGT's heels", International Gaming & Wagering Business (IGWB), May 1998, vol. 19, No. 5, pp. 1, 30, 32-34, 36-37: 7pp.
Website: "A New Generation", Casino Journal, Bally, World of Slots, (http //www casinocenter com/journal/oct97/html/bally html), download date: Jun. 4, 1998, 5pp.
Website: "The Game King", Casino Journal, IGT, World of Slots, (http //www casinocenter com/journal/oct97/html/igt html), download date: Jun. 4, 1998, 4pp.
Website: "The Interactive Experience", Casino Journal, AC Coin, World of Slots, (http //www casinocenter com/journal/oct97/html/ac_coin html), download date: Jun. 4, 1998, 3pp.
Sokolic, William H., "Gaming and Entertainment in Atlantic City", The New York Post, Jun. 18, 1998, Section: Entertainment, p. 061, 3pp.
"Silicon Gaming Releases Riddle of the Sphinx™; New Slot Game Offers Players Dual Win Opportunities", PR Newswire, Jul. 29, 1998, Section: Financial News, 1pg.
Montgomery, Christine, "Casinos Bet You'll Gamble With Your Health", The Palm Beach Post, Feb. 22, 1999, Section: Accent, p. 1D, 2pp.
Rosenberg, Amy S., "Elvis is in the building, and ready to take your money", The Sunday Gazette Mail, Mar. 21, 1999, Section: News, p. P13A, 4pp.
"Lottery.com Wins the Jackpot With OracleMobile.com; Two Leaders Team Up for the Wireless Market", Business Wire, Feb. 23, 2000, 3pp.
Website: "Riddle of the Sphinx™", (http // www silicongaming com/riddle-sphinx-description html), download date: Feb. 23, 2000, 3pp.
Website: "Money Time™", (http // www Mikohn com/moneytime html), download date: Mar. 24, 2000, 3pp.
Green, Marian, "The New Slot Market", International Gaming & Wagering Business, May 1998, 7 pp.
Brewer et al., "Gaming Language: Getting a Handle on Slots", Cornell Hotel & Restaurant Administration Quarterly, Apr. 1995, Section: vol. 36, No. 2, pg. 74, ISSN:0010-8804, 7 pp.
Rose, Bob, "New Ways for the House to Win", St. Louis Post-Dispatch, Oct. 3, 1996, Section: Get Out, 2 pp.
Brochure: "Power Play Slots", (http // www softsite com/ulti/), Jan. 1997, 13 pp.
"Shuffle Master Begins Immediate Rollout of Five Deck Frenzy and Introduces New Version of Let it Ride", PR Newswire, Jun. 30, 1997, Section: Financial News, 3 pp.
Review: "Five Deck Frenzy", by Shuffle Master and IGT, (http //pitboss corn/ R-5 shtm), download date: Feb. 1, 1998, 1 pg.
Brokopp, John, "New Slots Send Up Caution Flag", (http // brokopp casinocitytimes com/articles/545/ html), download date: Aug. 2, 1999, 2 pp.
Brochure: "Vision Series —5-Line Double Diamond Mine", IGT, Copyright 2000, 1 pg.
Website: "Double Diamond Mine Slot", (http // www igt com/GamingGroup/games/game asp?pid=5.12.108.119&theme_id=2390), download date: Feb. 9, 2004, 1 pg.
Legato, Frank, "When a Bonus. . .Isn't", Strictly Slots, (http // www strictlyslots com/archive/0006ss/html/behind html), download date: Feb. 9, 2004, 3 pp.
Website: "Wild Wizard Slots", Gameport.com, (http // gameport com/ pcgames/cards/000075 html), download date: Feb. 9, 2004, 2 pp.
Website: "Williams X-Factor —3 Coin Dotmation", AzSlot Machine Company —Used Slot Machines and Slot Machine Parts for Sale, (http // slotdepot com/723 html), download date: Feb. 9, 2004, 2 pp.
Fey, A Pictorial History of Slot Machine, The First 100 Years, Liberty Belle Books, 1983, pp. 89, 2 pp.
Schneier, Applied Cryptography 2e, Chapter 2, 1996, 27 pp.
"The Pennsylvania State Lottery: How to Play MATCH 6 LOTTO", http web archive org/web/20040806200223/http www palottery state pa us/lottery/cwp/view asp?A=3&Question_ID=479215$1otteryNav=%7c29736%7c download date: Aug. 6, 2004, 4 pp.
Notice of Allowability for U.S. Appl. No. 09/164,473 dated Aug. 6, 2004, 1 pg.
Notice of Allowability for U.S. Appl. No. 09/938,977 dated Mar. 23, 2004, 1 pg.
Office Action for U.S. Appl. No. 09/938,977 dated Sep. 12, 2003, 10 pp.
Office Action for U.S. Appl. No. 10/914,690 dated Apr. 17, 2007, 11 pp.
Office Action for U.S. Appl. No. 10/914,690 dated Dec. 14, 2007, 10 pp.
Notice of Allowance for U.S. Appl. No. 10/914,690, 7 pp. dated Apr. 2, 2009.
Notice of Allowance for U.S. Appl. No. 10/914,690, 7 pp.dated Dec. 22, 2008.
Office Action for U.S. Appl. No. 09/716,918 dated Jan. 8, 2008, 8 pp.
Office Action for U.S. Appl. No. 09/716,918 dated Dec. 8, 2006, 11 pp.
Office Action for U.S. Appl. No. 09/716,918 dated Jul. 20, 2005,10 pp.
Office Action for U.S. Appl. No. 09/716,918 dated Oct. 1, 2004, 7 pp.
Office Action for U.S. Appl. No. 09/716,918 dated Feb. 24, 2004, 6 pp.
Office Action for U.S. Appl. No. 09/716,918 dated May 20, 2003, 4 pp.
Office Action for U.S. Appl. No. 09/716,918 dated May 3, 2002, 4 pp.
Notice of Allowability for U.S. Appl. No. 09/526,834 dated Nov. 17, 2003, 2 pp.
Office Action for U.S. Appl. No. 09/526,834 dated Sep. 25, 2002, 15 pp.
Office Action for U.S. Appl. No. 09/526,834 dated Jan. 15, 2002, 14 pp.
Office Action for U.S. Appl. No. 09/108,646 dated Jan. 7, 2000, 5 pp.
Office Action for U.S. Appl. No. 09/108,646 dated May 10, 2000, 5 pp.
Office Action for U.S. Appl. No. 09/108,646 dated Dec. 28, 2000, 5 pp.
Office Action for U.S. Appl. No. 09/108,646 dated Jun. 18, 2001, 6 pp.
Notice of Allowability for U.S. Appl. No. 09/108,646 dated Nov. 28, 2001, 4 pp.
Office Action for U.S. Appl. No. 10/029,143 dated Mar. 28, 2003, 7 pp.
Notice of Allowability for U.S. Appl. No. 10/029,143 dated Sep. 25, 2003, 3 pp.
Notice of Allowability for U.S. Appl. No. 10/752,068 dated Sep. 22, 2004, 4 pp.

Office Action for U.S. Appl. No. 09/164,473 dated Jul. 17, 2000, 9 pp.
PCT International Search Report for Application No. PCT/US01/08483 dated Oct. 8, 2001, 7 pp.
Written Opinion for Application No. PCT/US01/08483 dated Jan. 18, 2002, 9 pp.
Transmittal of International Preliminary Examination Report for Application No. PCT/US01/08483 dated Aug. 20, 2002, 8 pp.
International Search Report for Application No. WO 2004/005090 dated Feb. 24, 2005, 2 pp.
Written Opinion for Application No. PCT/USO4/005090 dated Feb. 24, 2005, 3 pp.
International Preliminary Examination Report for Application No. PCT/USO4/005090 dated Apr. 6, 2005, 4 pp.

* cited by examiner

400

| GAME NAME 402 | GAME IDENTIFIER 404 | GAME SYMBOLS 406 | | BONUS SYMBOL(S) 408 |
|---|---|---|---|---|
| MUSIC MADNESS | G-871 |  |  |  |
| | | $20 | $5 | |
| | | $500 | $1,000 |  |
| | |  |  | |
| SUMMER FUN | G-522 |  |  |  |
| | | $10 | FREE TICKET | |
| | | $50 | $10,000 | |
| CASH FEVER | G-004 |  |  |  |
| | | $2 | $10 | |
| | | $100 | 2 MOVIE TICKETS | |
| LUCKY SLOTS | G-908 |  | BAR |  |
| | |  | $10 | |
| | | $100 | $1000 | |

600

| OUTCOME ID 602 | OUTCOME SYMBOLS 604 | BONUS SYMBOLS 606 | TIME REVEALED 608 | OUTCOME AWARD 610 |
|---|---|---|---|---|
| O-99-8889 | $5 $5 ♬ | NONE | 07/25/2001 4:53 PM | NONE |
| O-99-8890 | $20 $5 𝄞 | 𝄞 | 07/25/2001 4:54 PM | FREE TICKET |
| O-99-8891 | $5 $5 $5 | NONE | 07/27/2001 9:02 AM | $5 |
| O-99-8892 | ♪ ♪ $20 | ♪ ♪ | 07/27/2001 9:10 AM | NONE |
| O-99-8893 | ♪ ♬ 𝅝 | ♪ | 07/30/2001 11:14 AM | NONE |

FIG. 6

700

CURRENT TIME: 07/28/2001; 12:00 PM 750

BONUS SYMBOL: 𝄞 702

| | OCCURRENCE ID 704 | OCCURRENCE TIME 706 | EXPIRATION TIME 708 | STATUS 710 |
|---|---|---|---|---|
| 701 | 1 | 07/27/2001 11:01 PM | 07/28/2001 11:01 PM | EXPIRED |
| 703 | 2 | 07/27/2001 11:01 PM | 07/28/2001 11:01 PM | EXPIRED |
| 705 | 3 | 07/27/2001 12:02 PM | 07/28/2001 12:02 PM | ACTIVE |
| 707 | 4 | 07/27/2001 12:03 PM | 07/28/2001 12:03 PM | ACTIVE |
| 709 | 5 | 07/27/2001 12:04 PM | 07/28/2001 12:04 PM | ACTIVE |
| 711 | 6 | 07/28/2001 9:06 AM | 07/29/2001 9:06 AM | ACTIVE |

FIG. 7

800

| BONUS SYMBOL 802 | NUMBER OF OCCURRENCES 804 |
|---|---|
| 𝄞 | 4 |
| ☆ | 378 |

FIG. 8

| | OUTCOME ID 902 | GAME ID 904 | OUTCOME AWARD 906 | BONUS SYMBOLS 908 | STATUS 910 | PLAYER ID 912 |
|---|---|---|---|---|---|---|
| 950 | O-99-8892 | G-871 | NONE |  | PURCHASED | N/A |
| 951 | O-99-8893 | G-971 | NONE |  | PURCHASED | P-999-888-777 |
| 952 | O-99-8894 | G-522 | $50 | NONE | AVAILABLE | N/A |
| 953 | O-99-8895 | G-908 | $1,000 |  | AVAILABLE | N/A |

1000

| | GAME NAME 1002 | GAME ID 1004 | BONUS SYMBOLS 1006 | NUMBER REQUIRED 1008 | BONUS 1010 |
|---|---|---|---|---|---|
| 1018 | MUSIC MADNESS | G-871 | 𝄞 | 10 | $5 |
| 1020 | MUSIC MADNESS | G-871 | ♪ | 50 | $200 |
| 1021 | MUSIC MADNESS | G-871 | 𝄞 | 15 | $50 |
| | | | ♪ | 20 | |
| 1022 | SUMMER FUN | G-522 |  | 5 | ENTRY INTO CAR DRAWING |
| 1023 | CASH FEVER | G-004 | ☆ | 1000 | FREE AIRLINE TICKET |
| 1024 | LUCKY SLOTS | G-908 |  | 10 | MYSTERY GIFT AT BIG RETAILER |
| | | | | 25 | FREE DINNER FOR 2 AT LUXURY RESTAURANT |

1000

| | GAME NAME 1002 | GAME ID 1004 | BONUS SYMBOLS 1006 | NUMBER REQUIRED 1008 | BONUS 1010 |
|---|---|---|---|---|---|
| 1040 | RED, WHITE & BLUE | G-976 | ☆ | 3 OF SAME COLOR | $25 |
| 1042 | RED, WHITE & BLUE | G-976 | ☆ | 1 RED 1 WHITE 1 BLUE | $50 |
| 1044 | RED, WHITE & BLUE | G-976 | ☆ | 3 IN ANY COLOR COMBO | $10 |

FIG. 10B

METHODS AND APPARATUS FOR LOTTERY GAME PLAY AGGREGATION

CROSS-REFERENCE TO RELATED APPLICATIONS

The present application is a continuation of U.S. patent application Ser .No. 10/914,690 entitled "METHODS AND APPARATUS FOR LOTTERY GAME PLAY AGGREGATION" filed Aug. 9, 2004 and issued as U.S. Pat. No. 7,582,012 on Sep. 1, 2009;

which is a continuation-in-part of U.S. patent application Ser. No. 09/938,977, entitled "SYSTEMS AND METHODS FOR LOTTERY GAME PLAY AGGREGATION," filed Aug. 24, 2001 and issued as U.S. Pat. No. 6,773,345 on Aug. 10, 2004, which claims the benefit of U.S. Provisional Application No. 60/228,144 entitled "SYSTEMS AND METHODS FOR LOTTERY GAME PLAY AGGREGATION," filed Aug. 25, 2000. Each of the above applications is hereby incorporated by reference in its entirety into the present Application.

The present application is related to the following commonly-owned applications, each of which is incorporated by reference herein in its entirety:

(1) U.S. patent application Ser. No. 09/716,918, entitled "ELECTRONIC AMUSEMENT DEVICE AND METHOD FOR ENHANCED SLOT MACHINE PLAY," filed Nov. 20, 2000; which is a continuation of U.S. patent application Ser. No. 09/164,473 entitled "ELECTRONIC AMUSEMENT DEVICE AND METHOD FOR ENHANCED SLOT MACHINE PLAY," filed Oct. 1, 1998, and issued as U.S. Pat. No. 6,203,430 B1 on Mar. 20, 2001.

(2) U.S. patent application Ser. No. 09/526,834 entitled "SYSTEMS AND METHODS FOR DETERMINING A GAMING SYSTEM EVENT PARAMETER BASED ON A PLAYER-ESTABLISHED EVENT PARAMETER," filed Mar. 16, 2000 and issued as U.S. Pat. No. 6,719,631 B1 on Apr. 13, 2004. and (3) U.S. patent application Ser. No. 10/752,068 entitled "ELECTRONIC AMUSEMENT DEVICE OFFERING SECONDARY GAME OF CHANCE AND METHOD FOR OPERATING SAME," filed Jan. 6, 2004 and issued as U.S. Pat. No. 6,843,724 on Jan. 18, 2005; which is a continuation of U.S. patent application Ser. No. 10/029,143 filed Dec. 27, 2001, and issued Feb. 17, 2004, as U.S. Pat. No. 6,692,353 B2; which is a continuation of U.S. patent application Ser. No. 09/108,646 filed Jul. 1, 1998 and issued as U.S. Pat. No. 6,364,765 on Apr. 2, 2002;

(4) U.S. patent application Ser. No. 11/424,602 entitled "METHODS AND APPARATUS FOR LOTTERY GAME PLAY AGGREGATION", filed Jun. 16, 2006;

(5) U.S. patent application Ser. No. 11/424,607 entitled "METHODS AND APPARATUS FOR LOTTERY GAME PLAY AGGREGATION", filed Jun. 16, 2006.

FIELD OF THE INVENTION

The present invention relates generally to lottery games, and more particularly to electronic instant lottery games.

BACKGROUND OF THE INVENTION

Instant, or "scratch-off", lottery games are well known and widely practiced. Such instant lottery games are games that allow a player to purchase a chance to win one of a set of prizes. For example, for $1 a player may purchase a chance to win $10,000, $1,000, $100, or two (2) extra chances to win a prize. Such games typically involve the sale to a player of a paper or cardboard game ticket. A typical instant lottery game ticket includes a background section and a play section. The background section typically includes the name of the game, instructions for playing the game, information describing the game, and information describing how to win an award. The play section of such a ticket typically includes one or more play areas which contain an outcome. The outcome comprises a combination of symbols (e.g. alphanumeric characters or icons) that are initially hidden from the player. The outcome is typically hidden by an opaque covering material, such as a layer of latex. The player reveals the outcome by scratching off (such as with a coin) the covering layer over the symbols.

Certain outcomes or combinations of symbols in instant lottery games correspond to respective prizes. Which combinations of symbols correspond to which prizes is typically displayed to the player on the background area of the ticket. Thus, a player that purchases such an instant lottery ticket knows whether or not he has won a prize as soon as the covering layer is scratched off. If the outcome revealed by the player matches a combination of symbols that corresponds to a prize, the player may exchange the ticket with the winning outcome for the prize corresponding to the combination of symbols revealed on the ticket. For example, if the player purchased the instant lottery ticket from a convenience store and the corresponding prize is $25, the player may return to the convenience store and exchange the winning ticket for the $25. The convenience store may then turn in the exchanged ticket to the authority administering the lottery to recoup the $25 provided to the player. For larger prizes the player may need to turn in the ticket directly to the authority administering the lottery game.

Recently electronic instant lottery games have been gaining popularity. An example of such an electronic instant lottery game is disclosed in U.S. Pat. No. 5,871,398. U.S. Pat. No. 5,871,398 discloses an off-line remote lottery system which enables a player to purchase instant-type lottery game outcomes from a central computer. The player views the outcomes on a remotely located gaming computer, such as a Personal Digital Assistant (PDA). In such electronic versions of an instant lottery game each outcome is essentially a 'ticket' which the player purchases.

Both the traditional and the electronic instant lottery games offer opportunities for improvement. For example, the instant lottery game is played in a very short amount of time (i.e. the amount of time it takes a player to scratch off the latex covering and reveal the outcome). Once the player reveals the outcome the game is over. If the outcome does not correspond to a prize this feels very discouraging to the player, who may feel that the money that was spent on the purchase of the ticket vanished in an instant without providing a sufficiently entertaining experience. Such a feeling may discourage a player from purchasing another ticket. Also, the loyalty of a player who purchases tickets frequently or purchases a plurality of tickets is not recognized or rewarded in the prior art instant lottery systems, which may discourage a player from continuing to purchase tickets. At the very least the player is not encouraged to continue to purchase tickets for a particular instant lottery game or from a particular instant lottery game authority. Improvements to the prior art systems of instant lottery games are needed to overcome such disadvantages.

BRIEF DESCRIPTION OF THE DRAWINGS

FIG. 6 is a table representative of an embodiment of the player outcome database of FIG. 2.

FIG. 7 is a table representative of an embodiment of a record of the symbol occurrences database of FIG. 2.

FIG. 8 is a table representative of the bonus symbol occurrence meter(s) of FIG. 2.

FIG. 10B is a table representative of an embodiment of the bonus database of FIG. 3.

DETAILED DESCRIPTION

Figure 1:
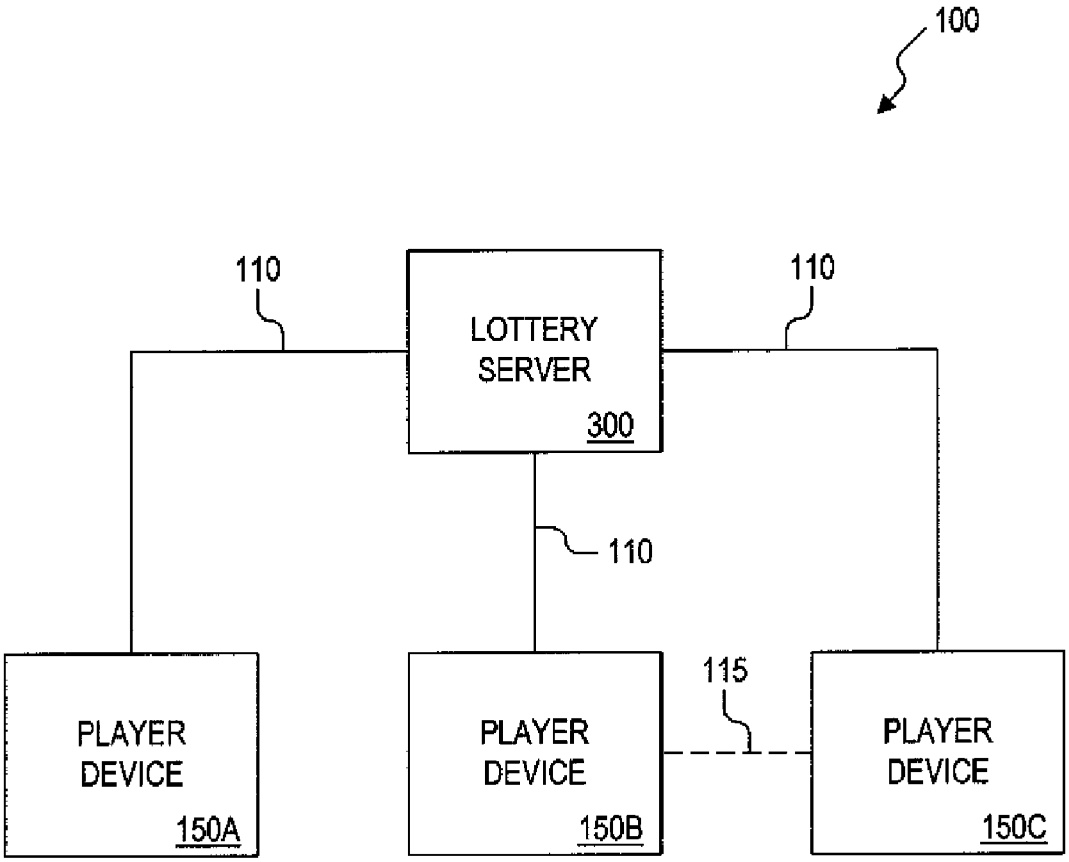
FIG. 1 is a block diagram overview of a lottery gaming system according to an embodiment of the present invention.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing instructions that may be read by a computer, a processor or a like device. Such a medium may take many forms, including but not limited to, non-volatile media, volatile media and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable-media may be involved in carrying a sequence of instructions to a processor.

Some embodiments of the present invention are directed to systems and methods for tracking a number of occurrences of a symbol in a lottery game within a duration comprising at least two outcomes and causing a bonus to be provided to a player if the number is at least a minimum number. That is, as a player plays a lottery game by revealing outcomes of the lottery game, the occurrence of at least one predetermined bonus symbol is tracked and counted. Once the player obtains a predetermined number of occurrences of a bonus symbol, the player is provided with a bonus. A player is potentially rewarded for playing a lottery game multiple times by receiving a bonus for accumulating a minimum number of occurrences of a symbol over the course of at least two outcomes of the game. Thus, even if the outcomes revealed by a player do not correspond to an award, such outcomes may lead to the obtainment of a bonus by the player if they contain at least one bonus symbol, the occurrence of which may be tracked.

Some embodiments of the systems and methods disclosed include wherein a number of occurrences of a first symbol within a duration is determined. The duration comprises at least two lottery game outcomes. A bonus is caused to be provided (e.g., to a player) if the number of occurrences of the first symbol within the duration is at least a minimum number of occurrences.

In some embodiments of the present invention a number of actual occurrences of the first symbol during the duration is determined, a number of occurrences of the first symbol that qualify for the bonus is determined, and the step of causing a bonus to be provided comprises causing a bonus to be provided if the number of occurrences of the first symbol that qualify for the bonus is at least a minimum number. For example, in some embodiments of the present invention an occurrence of a symbol may qualify for a bonus for a predetermined amount of time from the time of the occurrence.

As used herein an outcome may be a series of symbols or alphanumeric characters. Certain outcomes correspond to respective awards while other outcomes do not correspond to any award. A bonus symbol, as used herein, may be a symbol the occurrence of which is tracked for purposes of determining whether the number of occurrences qualifies for a bonus. A bonus symbol may comprise a symbol that comprises an outcome of a lottery game. Alternatively, a bonus symbol may comprise a symbol that is associated with an outcome of a lottery game. For example, a bonus symbol may be revealed essentially at the same time as an outcome but not be part of the outcome. An outcome is revealed to a player when the player can determine the symbols that comprise the outcome. For example, an outcome may be revealed to a player on a physical ticket (e.g., by scratching off a covering material), a player device such as a personal-digital-assistant (PDA) or cellular telephone when the player actuates a predetermined button on the player device.

A bonus symbol may be associated with a specific lottery game (e.g. a “cherry” may comprise a bonus symbol in a “casino” theme instant lottery game). In other embodiments of the present invention a bonus symbol may be associated with more than one instant lottery game. For example, a “cash” symbol may comprise a bonus symbol and appear in all lottery games administered by a given entity. In yet another embodiment each lottery game may be associated with a different bonus symbol, but each respective appearance of each of the bonus symbols in the various games for a respective player is counted in one running count. In such embodiments a player may thus collect a number of occurrences of a respective bonus symbol by playing various lottery games.

In accordance with embodiments of the present invention, the number of occurrences of a bonus symbol may be tracked by a player device on which a player is playing a lottery game or by a lottery server in communication with such a player device. The number of occurrences of the bonus symbol may be tracked in a continuous manner by keeping a running count of the number of occurrences. In such an embodiment each time a bonus symbol is revealed to a player the running count of occurrences of the bonus symbol is updated to reflect the occurrence. In other embodiments the number of occurrences of the bonus symbol is updated on a periodic or non-periodic basis that is not triggered by the revelation of a new outcome by a player. For example, the number of occurrence of a bonus symbol may be updated (i) after a predetermined amount of time passes since the last update (e.g. every hour), (ii) after a predetermined number of outcomes are revealed by a player since the last update (e.g. every 10 outcomes), (iii) when a player device communicates with the lottery server, or (iv) when a predetermined outcome is revealed to a player.

In accordance with embodiments of the present invention an occurrence of a bonus symbol may expire. As used herein, an occurrence of a bonus symbol expires when it no longer qualifies for a bonus or is no longer included in the number of occurrences of the bonus symbol for the purposes of determining whether a bonus is to be provided to a player. In some alternate embodiments of the present invention when a bonus symbol expires it qualifies for a lower bonus than a symbol that has not yet expired. A bonus symbol may expire upon the occurrence of certain expiration criterion.

Expiration criterion may comprise, for example, (i) a predetermined length of time from the time of an occurrence of a bonus symbol, (ii) a predetermined number of outcomes revealed after an occurrence of a bonus symbol, (iii) an end of a playing session (e.g. a time when the player logs off from the lottery game or does not play the lottery game for a predetermined amount of time), (iv) an occurrence of another predetermined symbol, (v) a win of a predetermined award by the player, (vi) a wager of a predetermined amount by a player, (vii) a frequency with which a player reveals outcomes, (vii) a random factor such as a determination utilizing a random number generator (viii) the occurrence of an event or condition external to the lottery game (e.g. the local baseball team wins), (ix) the occurrence of a specific time (e.g. Jan. 1, 2002 at midnight), and/or (viii) a determination that a player or player device is no longer in a certain geographical area.

The expiration criterion associated with an occurrence of a symbol may be based on (i) the symbol, (ii) the particular occurrence of the symbol (e.g. based on what time the occurrence was revealed), (iii) the lottery game associated with the occurrence, (iv) the player associated with the occurrence, and/or (v) a player device associated with the occurrence. For example, in one embodiment each occurrenice of a “cash” bonus symbol revealed by a player expires ten (10) minutes after the time of the occurrence. In another embodiment each “cherry” symbol expires (i) after ten (10) outcomes if the player is classified as a “frequent player” and (ii) after five (5) outcomes if the player is not classified as a “frequent player”. More than one expiration criterion may be associated with a respective occurrence of a bonus symbol.

In embodiments where the expiration of an occurrence of a symbol occurs after a predetermined amount of time, the countdown of the time to expiration may be based only on the time that a player is actively playing the lottery game or on the passage of time regardless of whether the player is actively playing the game.

In some embodiments of the present invention the time during which the occurrence of a symbol qualifies for a bonus may be extended. For example, the time of expiration may be adjusted to a later time based on (i) a payment by a player associated with the occurrence, (ii) the occurrence of another symbol, (ii) purchase of additional outcomes by a player, or (iii) a random factor.

In accordance with embodiments of the present invention, a player using a remote player device requests at least one instant lottery game outcome from a lottery server. The request may include payment for the outcome. In response to the request the lottery server transmits the number of requested outcomes or outcome results to the player device. In one embodiment the lottery server does not transmit an outcome to a player device (i.e. the combination of symbols comprising the outcome) but rather transmits an outcome result to the player device. The outcome result includes an indication of an award and a number of bonus symbols to be included in the outcome. The symbols corresponding to the lottery game and the symbol combinations that correspond to the available awards for the game are stored on the player device. In such an embodiment the player device determines what symbols to display to a player as the outcome corresponding to the outcome result transmitted by the lottery server. The player device selects a combination of symbols to display that corresponds to the award indicated by the lottery server. The player device also includes in the outcome the number of bonus symbols indicated by the lottery server. In another embodiment of the present invention the lottery server determines the outcome (i.e. the combination of symbols) and transmits the outcome rather than just the outcome result to the player device.

After a player purchases at least one outcome from the lottery server the player plays the lottery game by revealing the outcome. The player may do this by actuating a button on the player device. If the player device is a PDA, the player may "scratch" the screen of the PDA with a stylus in order to reveal the outcome. The number of occurrences of bonus symbols in such revealed outcomes is tracked, as discussed above, and a player is provided a bonus if the number of occurrences of a respective bonus symbol over at least two outcomes is at least a predetermined number.

For example, assuming that a player has purchased twenty (20) outcomes of an instant lottery game in which the "cash" symbol is the bonus symbol that is being tracked, the player device tracks the number of times the "cash" symbol appears in an outcome of the game. Assuming also that fifteen (15) "cash" symbols are needed to qualify for a bonus of $25, the player will be provided with $25 if he "collects" the fifteen (15) "cash" symbols. Thus, even if the outcomes the player reveals do not correspond to any awards (i.e. all the outcomes turn out to be losing outcomes), the player does not feel as disappointed each time he or she reveals a losing outcome if the outcome contains or is associated with a "cash" symbol because the player is adding to the running count for the bonus. Such a player may be motivated to purchase additional outcomes of the game if, for example, the running count indicates that twelve (12) "cash" symbols have been collected thus far, even if the player's last few outcomes have been losing ones. In the prior art systems the player may not feel this motivation and be discouraged from purchasing any more outcomes because he or she does not have a sense of investment, such as towards the bonus disclosed in Applicant's invention.

System Overview

Turning now in detail to the drawings, FIG. 1 is a block diagram overview of a gaming system 100 according to one embodiment of the present invention. As will be described, the gaming system 100 may be used to provide outcomes to a player. The gaming system 100 includes a lottery server 300 in communication with player devices 150A, 150B, and 150C. As used herein, devices (such as the lottery server 300, and/or the player devices 150A, 150B, and 150C) may communicate, for example, via a communication network, such as a Local Area Network (LAN), a Metropolitan Area Network (MAN), a Wide Area Network (WAN), a Public Switched Telephone Network (PSTN), or an Internet Protocol (IP) network such as the Internet, an intranet or an extranet. Moreover, as used herein, communications include those enabled by wired or wireless technology. Note that although a single lottery server 300 and three player devices 150A, 150B, and 150C are shown in FIG. 1, any number of lottery servers or player devices may be included in the gaming system 100.

In one embodiment of the present invention, the player devices 150A, 150B, and 150C communicate with a remote, Web-based lottery server 300 through the Internet. Communication between the lottery server 300 and the player devices 150A, 150B, and 150C is illustrated by communication links 110. In some embodiments any of the player devices 150A, 150B, and 150C may communicate directly with another of the player devices 150A, 150B, and 150C, as illustrated by communication link 115. The player devices 150A, 150B and 150C may also communicate with each other indirectly (e.g. via lottery server 300). Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, and/or a wireless communication system.

The lottery server 300 may be any device capable of performing the functions described herein. For example, the lottery server 300 may be a computer associated with a state lottery and configured to generate and/or transmit lottery game outcomes or an award amount.

Similarly, each of the player devices 150A, 150B, and 150C may be any device capable of performing one or more of the functions described herein. A respective player device 150A, 150B, or 150C may be, for example: a personal computer, a portable computing device such as a PDA, a wired or wireless telephone, a one-way or two-way pager, a kiosk (e.g., an instant lottery kiosk located at an airport terminal), an Automated Teller Machine (ATM) device, a Point Of Sale (POS) terminal, a game terminal (e.g., a video poker terminal), a smart card, or any other appropriate storage and/or communication device. For example, player device 150A may be a PDA, player device 150B may be a cellular telephone, and player device 150C may be a kiosk.

Note that the player devices 150A, 150B, and 150C need not be in constant communication with the lottery server 300. For example, the player devices 150A, 150B, and 150C may only communicate with the lottery server 300 via the Internet when attached to a "docking" station or "cradle" coupled to the player's PC. The player devices 150A, 150B, and 150C may also communicate with the lottery server 300 via an Infra Red (IR) port when near a kiosk (e.g., located in a merchant's store).

Any of the lottery server 300 and the player devices 150A, 150B, and 150C may be incorporated in a single device (e.g., a kiosk located in a merchant's store may act as a player device 150A, 150B, and/or 150C and a lottery server 300).

According to one embodiment of the present invention, the lottery server 300 may receive a request from a player device 150A, 150B, or 150C on behalf of a player, for a lottery game outcome. The request may include a player device identifier or a player identifier (e.g. if more than one player uses a player device, each player may uniquely identify him or herself via a player identifier). The request may further include a payment amount for the requested outcome. For example, the request may include a financial account number identifying an account from which the payment for the requested outcome may be deducted. Alternatively, the request may include digital currency. In some embodiments the request may include an indication of payment previously made or an indication of a value to which the player or player device is entitled. For example, a player may pay a local retailer an amount in exchange for access to outcomes on the lottery server 300 (e.g. the retailer may provide the player with a code that entitles the player to a predetermined number of outcomes).

In response to the request the lottery server 300 may generate an outcome or outcome result. Alternatively lottery server 300 may retrieve an outcome or an outcome result from a database of previously generated outcomes or outcome results and transmit the outcome or outcome result to the player device 150A, 150B, or 150C. The lottery server 300 may then transmit the outcome or outcome result to the player device 150A, 150B, or 150C from which the request was received. The lottery server 300 may additionally store an indication of the outcome or outcome result that was transmitted along with other information (e.g. the player identifier or player device identifier received in the request or the time at which the outcome was transmitted) in memory.

According to another embodiment of the present invention, the lottery server 300 may (i) receive an indication of an outcome revealed on a player device 150A, 150B, or 150C; (ii) determine whether any symbols are being tracked in association with the player device 150A, 150B, or 150C or a player using the player device 150A, 150B, or 150C; and (ii) update a running count of each of the tracked symbols based on the outcome revealed. For example, if lottery server 300 determines that a revealed outcome includes or is associated with a symbol being tracked, the lottery server 300 may update the associated running count by increasing the count by the number of occurrences, in the revealed outcome, of the symbol being tracked. The lottery server 300 may additionally decrease the running count of the symbol being tracked based on whether any expiration criteria have been satisfied. In such an embodiment the lottery server 300 tracks any symbols being accumulated by the player as the symbols are revealed by the player. In other embodiments the lottery server is not in communication with the player device 150A, 150B, and 150C as an outcome is revealed on player device 150A, 150B, and 150C and thus does not track any symbols as outcomes are revealed.

In yet another embodiment of the present invention, the lottery server 300 may receive an indication of accumulated symbols from a player device 150A, 150B, or 150C. The lottery server 300 may thus determine whether a bonus should be provided to a player associated with the player device 150A, 150B, or 150C based on this indication.

Player Device

Figure 2:
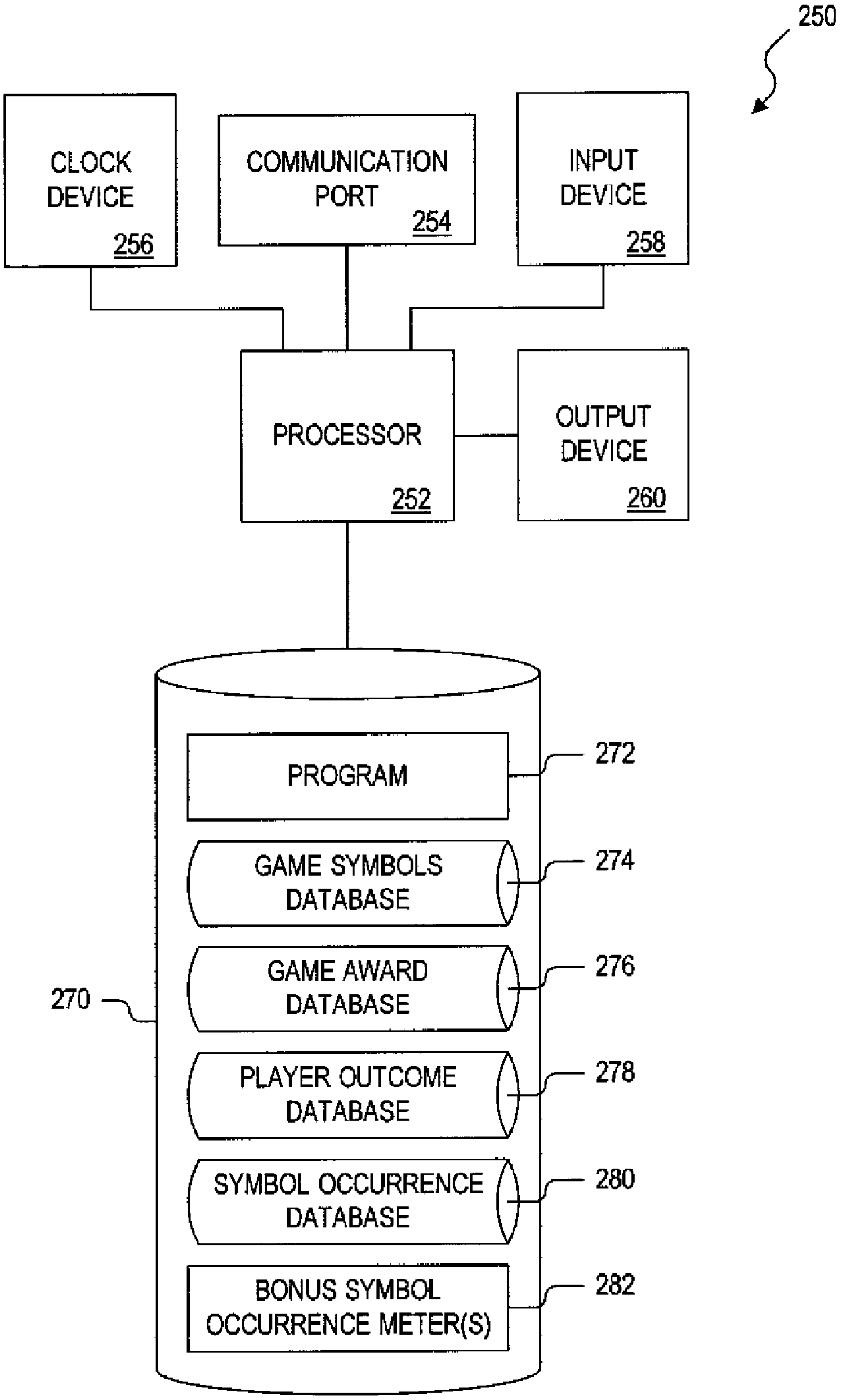
FIG. 2 is a block schematic diagram of a player device according to an embodiment of the present invention.

Turning now to FIG. 2, a player device 250 that is representative of any of the player devices 150A, 150B, and 150C shown in FIG. 1, is illustrated according to an embodiment of the present invention. The player device 250 comprises a processor 252, such as one or more INTEL® Pentium® processors, coupled to a communication port 254 configured to communicate via a communication network (not shown in FIG. 2). The communication port 254 may be used to communicate, for example, with the lottery server 300 and/or another player device. The processor 252 also communicates with a clock device 256, such as to determine a current time or a time period.

The processor 252 is also in communication with an input device 258. The input device 258 may comprise, for example: a keyboard, a mouse or other pointing device, a microphone, a knob or a switch (including an electronic representation of a knob or a switch), and/or a touch screen. The input device 258 may be used, for example, to receive from a player a request to reveal an outcome or establish communication with lottery server 300.

The processor 252 is also in communication with an output device 260. The output device 260 may comprise, for example: a display screen, a speaker, and/or a printer. The output device 260 may be used, for example, to indicate to a player a revealed outcome or a number of occurrences of a bonus symbol.

The processor 252 is also in communication with a storage device 270. The storage device 270 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 270 stores a program 272 for controlling the processor 252. The processor 252 performs instructions of the program 272, and thereby operates in accordance with the present invention. For example, the processor 252 may determine a plurality of outcomes revealed by a player, determine a number of occurrences of a bonus symbol, and determine a bonus associated with the number of occurrences of the bonus symbol.

The program 272 may be stored in a compressed, uncompiled and/or encrypted format. The program 272 may furthermore include other program elements, such as an operating system, a database management system, and/or "device drivers" used by the processor 252 to interface with peripheral devices. Such program elements are known to those skilled in the art.

As used herein, information may be "received" by or "transmitted" to, for example: (i) the player device 250 from the lottery server 300, and/or (ii) a software application or module within the player device 250 from another software application, module, or any other source.

Storage device 270 also stores a game symbols database 274 (described in detail in FIG. 4), a game award database 276 (described in detail in FIG. 5), a player outcome database 278 (described in detail in FIG. 6), and a symbol occurrence database 280 (described in detail in FIG. 7), and at least one bonus symbol occurrence meter 282 (described in detail in FIG. 8).

Lottery Server

Figure 3:
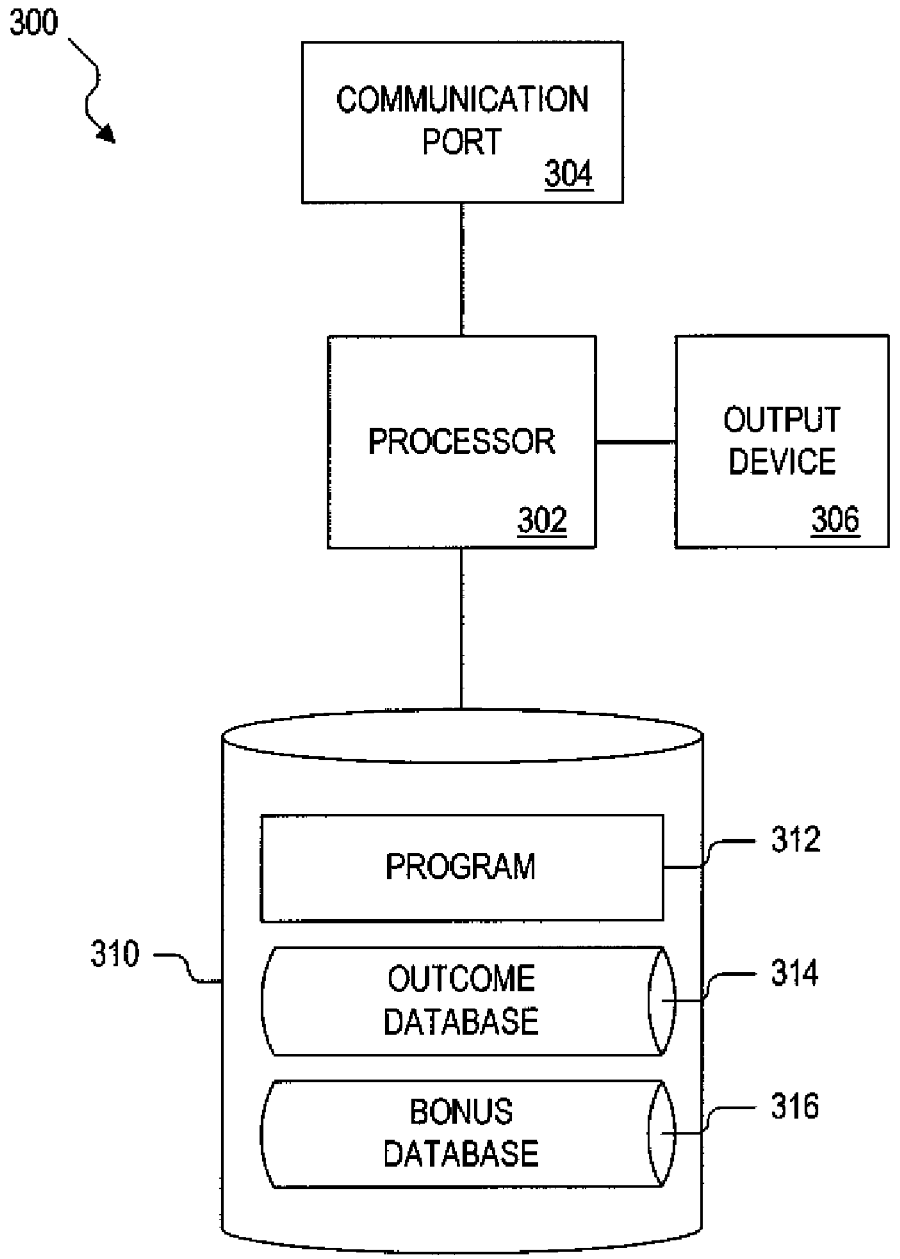
FIG. 3 is a block schematic diagram of a lottery server according to an embodiment of the present invention.

FIG. 3 illustrates a lottery server 300 that is descriptive of the device shown in FIG. 1, according to an embodiment of the present invention. The lottery server 300 comprises a processor 302, such as one or more INTEL® Pentium® processors, coupled to a communication port 304 configured to communicate via a communication network (not shown in FIG. 3). The communication port 304 may be used to communicate, for example, with one or more player device 250. The processor 302 also communicates with a clock device 306, such as to determine a current time or a time period.

The processor 302 is also in communication with a storage device 310. The storage device 310 may comprise any appropriate information storage device, including combinations of magnetic storage devices (e.g., magnetic tape and hard disk drives), optical storage devices, and/or semiconductor memory devices such as RAM devices and ROM devices.

The storage device 310 stores a program 312 for controlling the processor 302. The processor 302 performs instructions of the program 312, and thereby operates in accordance with the present invention. For example, the processor 302 may determine that a request for an outcome has been received, determine an outcome in response to the request, and transmit the outcome in response to the request.

The program 312 may be stored in a compressed, uncompiled and/or encrypted format. The program 312 may furthermore include other program elements, such as an operating system a database management system, and/or "device drivers" used by the processor 302 to interface with peripheral devices. Such program elements are known to those skilled in the art.

As used herein, information may be "received" by or "transmitted" to, for example: (i) the lottery server 300 from one or more player devices 250, and/or (ii) a software application or module within the lottery server 300 from another software application, module, or any other source.

Figure 9:
FIG. 9 is a table representative of an embodiment of the outcome database of FIG. 3.
Figure 9:
Figure 9:
Figure 10A:
FIG. 10A is a table representative of an embodiment of the bonus database of FIG. 3.
Figure 10A:

As shown in FIG. 3, the storage device 310 also stores an outcome database 314 (described in detail in FIG. 9) and a bonus database 316 (described with respect to FIGS. 10A-10B).

Databases

Examples of databases that may be used in connection with the gaming system 100 will now be described in detail with respect to FIGS. 4 through 10. The schematic illustrations and accompanying descriptions of the databases presented herein are exemplary, and any number of other database arrangements could be employed besides those suggested by the figures. Although limited numbers of entries for a respective database are illustrated in the figures, any number of entries may be used. Furthermore, although certain databases are illustrated as stored in player devices 250 and certain databases are illustrated as stored in lottery server 300, any of the databases illustrated herein (or portions thereof) may be stored in any of the devices of system 100 without departing from the scope of the present invention.

Game Symbols Database

Figure 4:
FIG. 4 is a table representative of an embodiment of the game symbols database of FIG. 2.
Figure 4:
Figure 4:
Figure 4:
Figure 4:
Figure 4:
Figure 4:
Figure 4:
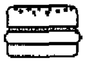
Figure 4:
Figure 4:
Figure 4:
Figure 4:
Figure 4:
Figure 4:
Figure 4:

Referring to FIG. 4, a table 400 represents an embodiment of the game symbols database 274 (FIG. 2) that may be stored at a player device 250, according to an embodiment of the present invention. The table 400 includes entries identifying symbols corresponding to lottery games that can be played by a player. The table 400 also defines fields 402, 404, 406, and 408 for each of the entries. The fields specify: a game name 402; a game identifier 404; game symbols 406; and bonus symbol(s) 408. The information in the table 400 may be created and updated, for example, based on information received from the lottery server 300.

The game name 402 may be an identifying name displayed to a player of the gaming device 250, identifying to the player which lottery game is being played. The game identifier 404 may be, for example, an alphanumeric code associated with a game that can be played by a player. The game symbols field 406 stores an indication of the symbols that correspond to the game identifier 404. These are the symbols that are combined to form an outcome displayed to a player playing the game corresponding to game identifier 404.

Player device 250 may reference the game symbols field 406, for example, to determine what symbols are available for display to a player when a player is playing a game corresponding to game identifier 404. Bonus symbols(s) field 408 stores an indication of what symbols comprise bonus symbols in a game corresponding to game identifier 404. Player device 250 may reference field 408 to identify the symbols the occurrence of which to track while a player is playing a game corresponding to game identifier 404. It should be noted that in some games there may be more than one bonus symbol to track.

Game Awards Database

Figure 5:
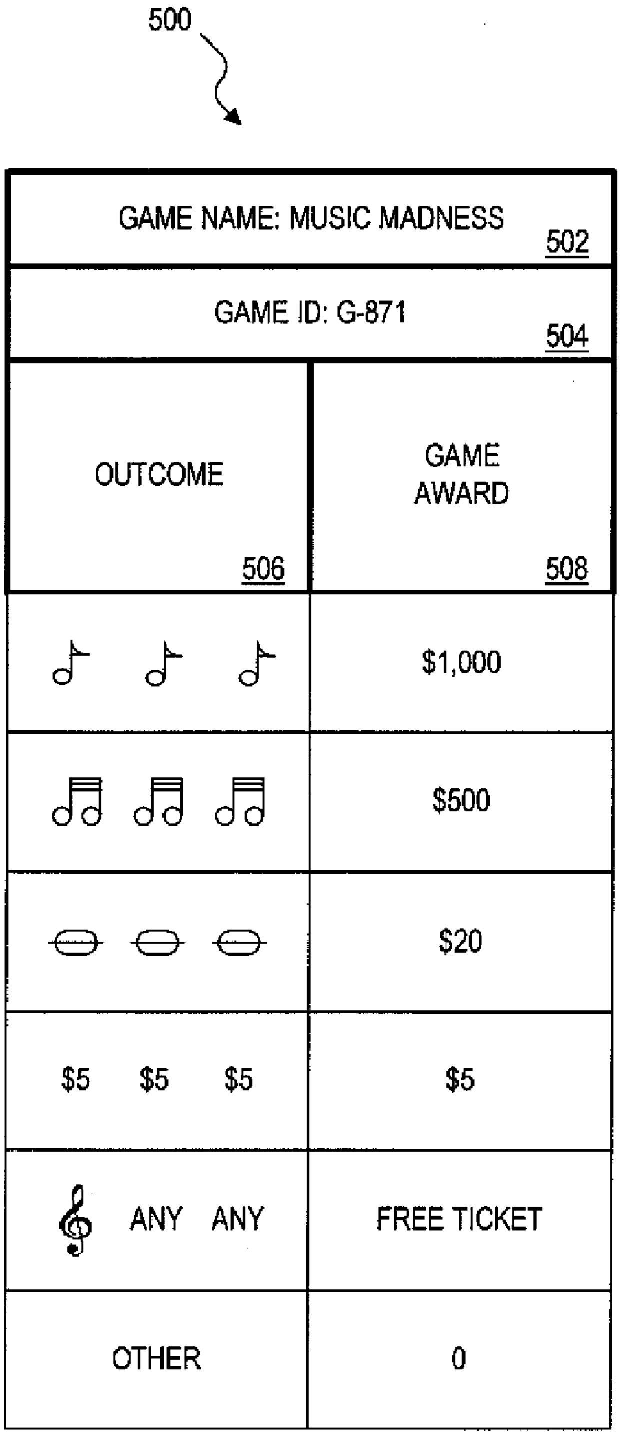
FIG. 5 is a table representative of an embodiment of a record of the game awards database of FIG. 2.

Referring to FIG. 5, a record 500 represents an embodiment of a record of the game awards database 276 (FIG. 2) that may be stored at a player device 250, according to an embodiment of the present invention. The record 500 identifies awards corresponding to a respective lottery game that can be played by a player. Player device 250 may store a similar record for each of the lottery games available to a player on player device 250. The record 500 defines fields 502, 504, 506, and 508. The fields specify: a game name 502; a game identifier 504; a game outcome 506; and a game award 508 corresponding to each game outcome 506. The information in the record 500 may be created and updated, for example, based on information received from the lottery server 300.

Player device 250 may reference record 500, for example, to determine what symbols to display to a player based on an outcome result that is transmitted from the lottery server 300. In some embodiments of the present invention lottery server 300 does not generate or transmit an outcome to the player device 250 in response to a request for an outcome but rather determines and transmits an outcome result. An outcome result is the award, if any, corresponding to an outcome rather than the combination of symbols that comprise the outcome. In such an embodiment the symbols that correspond to a respective game are stored on the player device and the player device determines what symbols to display as an outcome to a player based on the outcome result received from the lottery server 300. For example, in accordance with this embodiment, if a result outcome of "winner of $5" is received from the lottery server 300 for game "G-871" the player device 250 determines and displays an outcome that corresponds to such an outcome result. Based on the data illustrated in table 500, that outcome would be a series of three "$5" symbols. In another embodiment the lottery server 300 can store the symbols corresponding to a respective game and transmit the symbol combination comprising an outcome to the player device.

Player Outcome Database

Referring to FIG. 6, a table 600 represents an embodiment of the player outcome database 278 (FIG. 2) that may be stored at a player device 250, according to an embodiment of the present invention. The table 600 includes entries which identify outcomes stored at a player device 250. The table 600 defines fields 602, 604, 606, 608, and 610 for each of the entries. The fields specify: an outcome identifier 602, outcome symbols 604, bonus symbol(s) 606, a time revealed 608, and an outcome award 610. The information in the table 600 may be created and updated, for example, based on information received from the lottery server 300 or upon activity by the player (e.g. the time at which a player causes an outcome to be revealed).

The outcome identifier 602 uniquely identifies an outcome. The outcome symbols field 604 stores an indication of the symbols that comprise the outcome corresponding to outcome identifier 602. The bonus symbol(s) field 606 stores an indication of the bonus symbols, if any, associated with the outcome identified by corresponding outcome identifier 602. The time revealed field 608 stores an indication of the time at which the outcome corresponding to outcome identifier 602 or the bonus symbol(s) 606 was revealed to a player. The outcome award field 610 stores an indication of what award, if any, is associated with the outcome identified by outcome identifier 602.

Player device 250 may reference table 600, for example, to store information corresponding to an outcome as it becomes available. For example, in one embodiment the player device 250 creates a new record in table 600 when an outcome or outcome result is received from lottery server 300. An outcome identifier 602 may be received from the lottery server 300 or assigned by player device 250. Outcome symbols 604 that comprise the outcome corresponding to outcome identifier 602 may be received from lottery server 300 or determined by player device 250 based on an outcome result received from lottery server 300. The time revealed 608 may be updated once the outcome corresponding to outcome identifier 602 is revealed to a player.

Symbol Occurrence Database

Referring now to FIG. 7, a record 700 is representative of a record in symbol occurrence database 280 (FIG. 2) that may be stored at a player device 250, according to an embodiment of the present invention. The record 700 contains information regarding occurrences of a respective bonus symbol such as may be displayed on player device 250. Player device 250 may store similar records for other respective bonus symbols the occurrences of which are being tracked by player device 250. The record 700 defines fields 750, 702, 704, 706, 708 and 710. The fields specify: a current time 750, a bonus symbol 702, an occurrence identifier 704, an occurrence time 706, an expiration time 708, and a status 710. The information in the record 700 may be created and updated, for example, based on information received from the lottery server 300 or on activity by the player (e.g. a player causing a bonus symbol to occur by revealing an outcome).

The current time field 750 stores an indication of the current time according to clock device 256 and may be used to determine whether the occurrence of a symbol has expired, in accordance with some embodiments of the invention. The bonus symbol field 702 stores an indication of the bonus symbol the occurrence of which is tracked via record 700. The occurrence identifier field 704 stores an alphanumeric identifier that uniquely identifies the occurrence of the symbol. The occurrence time field 706 stores an indication of the time at which the occurrence of the bonus symbol was detected (e.g. based on the time in accordance with clock device 256 at the time the bonus symbol was revealed to the player). The expiration time field 708 stores an indication of the time at which the corresponding occurrence no longer qualifies for a bonus, or "expires".

The status field 710 stores an indication of whether a respective occurrence of the symbol of record 700 is currently "active" or is "expired". If the status is "expired" then the corresponding occurrence of the symbol no longer qualifies for a bonus and is, in some embodiments, no longer included in the running count of occurrences of the symbol. If the status is "active" then the corresponding occurrence of the symbol does qualify for a bonus and is included in the running count of occurrence of the symbol. The player device 250 may update the status of an occurrence of a symbol (i) periodically (e.g. every minute), (ii) upon a new outcome being revealed, (iii) upon a request of a player, and/or (iv) upon a request of lottery server 300.

Record 700 may be referenced by player device 250 each time a bonus symbol that is being tracked is revealed to a player as part of, or in association with, an outcome. Upon each such occurrence of a bonus symbol player device 250 may assign an occurrence identifier to the occurrence of the symbol and store the occurrence identifier in association with the time of the occurrence in an entry of record 700.

As discussed above, the expiration of an occurrence of a symbol may be based on various expiration criteria such as a time from the initial occurrence of the symbol or the occurrence of another symbol. The embodiment illustrated via the data stored in record 700 is one in which an occurrence of a symbol expires within a predetermined time of the time of the occurrence. Specifically, the data in record 700 indicates that the occurrence of the symbol being tracked expires 24 hours after the occurrence of the symbol. As illustrated by the exemplary data of FIG. 9, assuming clock device 256 generates a current time of "Jul. 28, 2001; 12:00 pm" (current time field 750), entries 701 and 703 illustrate that occurrences "1" and "2" have each been set to a status of "expired" since the current time is past the expiration time for each respective entry.

Bonus Symbol Occurrence Meter(s)

Referring now to FIG. 8, table 800 represents an embodiment of bonus symbol occurrence meter(s) 282 (FIG. 2) that may be stored at a player device 250, according to an embodiment of the present invention. The table 800 contains information regarding a current number of occurrences of tracked bonus symbols. The table 800 defines fields 802 and 804. The fields specify: a bonus symbol 802, and a number of occurrences 804.

The bonus symbol field 802 identifies the bonus symbol the occurrences of which are being tracked. The number of occurrences field 804 stores a current number of occurrences of the corresponding bonus symbol 802. The number of occurrences 804 may be an actual number of occurrences of the corresponding bonus symbol or may be a number of occurrences that qualify for a bonus (e.g. the number may not include the occurrences that have expired). The number of occurrences 804 may be determined based on the data stored in table 700. The information in the table 800 may be created and updated, for example, based on information received from the lottery server 300 or upon activity by the player (e.g. a player causing a bonus symbol to occur by revealing an outcome).

Outcome Database

Referring now to FIG. 9, table 900 illustrates an embodiment of the outcome database 314 (FIG. 3) that may be stored at lottery server 300, according to an embodiment of the present invention. The table 900 contains records 950 through 953, each record containing information regarding a respective outcome of a lottery game administered by lottery server 300. The table 900 defines fields 902, 904, 906, 908, 910, and 912. The fields specify: an outcome identifier 902, a game identifier 904, an outcome award 906, bonus symbols 908, a status 910, and a player identifier 912. The information in the record 900 may be created and updated, for example, based on information generated or received by the lottery server 300 or on activity by the player (e.g. a player purchasing an outcome).

The outcome identifier field 902 uniquely identifies an outcome generated or determined by lottery server 300. The game identifier field 904 identifies the lottery game corresponding to outcome identifier 902. The outcome award field 906 indicates the award, if any, corresponding to the outcome identifier 902. The bonus symbols field 908 indicates the bonus symbols associated with corresponding outcome identifier 902. The status field 910 indicates the current status of the outcome identified by corresponding outcome identifier 902. Table 900 illustrates possible statuses of "available" and "purchased". A status of "available" indicates that the outcome corresponding to the outcome identifier 902 is available for transmission to a player that requests purchase of an outcome. A status of "purchased" indicates that the outcome corresponding to outcome identifier 902 has been purchased by a player and is no longer available.

Other statuses besides those illustrated in table 900 may be used. For example, a status of "redeemed" may be used to indicate that a player that purchased an outcome has redeemed the award corresponding to the outcome.

The player identifier field 912 uniquely identifies a player associated with corresponding outcome identifier 902. In an alternate embodiment a player identifier may not be stored in association with the outcome identifier 902. In yet another alternate embodiment, a player device identifier may be stored instead of or in addition to the player identifier 912.

Lottery server 300 may reference table 900 each time an outcome is generated or determined. For example, lottery server 300 may generate a plurality of outcomes or outcome results at certain times, assign each a unique outcome identifier, and store the outcome identifier and associated information in table 900. Lottery server 300 may also reference table 900, for example, to determine an outcome or outcome result to transmit to a player in response to a request from the player to purchase an outcome or outcome result.

Bonus Database

Referring now to FIGS. 10A-10B, table 1000 represents an embodiment of the bonus database 1000 (FIG. 3) that may be stored at lottery server 300, according to an embodiment of the present invention. The table 1000 contains a number of entries, each entry defining a number of occurrences of a respective tracked bonus symbol that corresponds to a respective bonus. The table 1000 defines fields 1002, 1004, 1006, 1008, and 1010 for each entry. The fields specify: a game name 1002, a game identifier 1004, bonus symbols 1006, a number required 1008, and a bonus 1010.

The game name 1002 identifies the name of a lottery game administered by lottery server 300, as it may be displayed to a player. The game identifier 1004 uniquely identifies the game corresponding to game name 1004. The bonus symbols field 1006 indicates the bonus symbol(s) that correspond to the game identifier 1004. That is, bonus symbol field 1006 indicates which symbol(s) are to be tracked for a game identified by game identifier 1004. The number required field 1008 indicates the number of occurrences of the bonus symbol(s) identified in field 1006 that need to be obtained by a player in order to qualify for a bonus. Finally, the bonus field 1010 indicates the bonus that is to be provided to a player if the number of occurrences of the bonus symbol(s) 1006 is at least the number indicated in number required field 1008.

As illustrated in the example data of table 1000 in FIG. 10A, more than one award may correspond to different respective numbers of occurrences of the same symbol for a respective game. Thus, as entry 1024 illustrates, if ten (10) occurrences of a "cherry" symbol in game "G-908" are obtained by a player, the player is to be provided "a free mystery gift from Big Retailer". If twenty-five (25) occurrences of the "cherry" symbol are obtained by a player for game "G-908", however, the player is to be provided with a "free dinner for two at Luxury Restaurant". In such an embodiment, the player may have the option to determine when he or she would like to exchange the number of occurrences of a symbol for a bonus. In other words, in the example discussed above, a player that has obtained ten (10) occurrences of the "cherry" symbol in game "G-908" may choose to redeem those ten (10) occurrences for a free mystery gift at Big Retailer or to keep the ten (10) occurrences and keep trying to earn fifteen (15) more occurrences in order to obtain twenty-five (25) occurrences of the bonus "cherry" symbol and qualify for the free dinner for two at Luxury Restaurant. In one embodiment of the present invention a player may obtain more than one bonus for a respective running count. For example, in the example given above the player may be provided with the "free mystery gift from Big Retailer" once the running count of the occurrences of the "cherry" symbol reaches ten (10) and still retain the ten (10) occurrences in the running count, thus retaining the opportunity to increase the running count to twenty-five (25) and also earn the "free dinner for two at Luxury Restaurant".

Lottery server 300 may reference the table 1000 to determine whether a number of occurrences of a symbol obtained by a player is at least a minimum number (e.g. the number specified in the number required field 1008). Lottery server 300 may also reference table 1000 to determine what symbol comprises the bonus symbol(s) for a respective game. For example, if lottery server 300 receives a request for a bonus award from a player device 250, including a game identifier and a number of occurrences of a symbol obtained, lottery server 300 may reference table 1000 to determine (i) whether the symbol indicated in the request is the bonus symbol corresponding to the bonus identifier, (ii) whether the number of occurrences of the symbol indicated in the request is at least a minimum number, and (iii) what bonus corresponds to the number of occurrences of the bonus symbol indicated in the request. Based on the illustrative data of table 1000 (in FIG. 10A), if lottery server 300 receives an indication that at least ten (10) "cherries" have been obtained by a player playing game "G-908", lottery server determines that a "mystery gift from Big Retailer" is to be provided to the player.

As discussed above, in some games there may be more than one bonus symbol to track. As illustrated in the example data of table 1000 in FIG. 10A, different bonuses may correspond to respective numbers of occurrences of different symbols. Thus, entry 1018 illustrates that if ten (10) occurrences of a "staff" symbol in game "G-871" are obtained by a player, the corresponding bonus is "$5." For the same game, a "$200" bonus corresponds to a player obtaining fifty (50) occurrences of a "note" symbol. According to some embodiments, for a particular game, a bonus may correspond to a player obtaining a combination of respective numbers of occurrences of different symbols. Thus, as entry 1021 illustrates, if fifteen (15) occurrences of a "staff" symbol and twenty (20) occurrences of a "note" symbol in game "G-871" are obtained by a player, the player is allowed to receive a bonus of "$50." Although only two different types of symbols are depicted in entry 1021, it will be understood that any combination(s) of any number of different types of symbols may be used.

FIG. 10B illustrates another example of a game in which there is more than one type of symbol to track in that game. In an exemplary "RED, WHITE & BLUE" game, a red, white, or blue "star" bonus symbol may be revealed. In accordance with various embodiments described herein, the exemplary "RED, WHITE & BLUE" game comprises a standard primary game (e.g., an instant or "scratch-off" lottery game with corresponding outcomes) and also allows for a secondary or bonus game based on the occurrence of bonus symbols over multiple plays. For example, rules of the primary game might state: "Reveal three (3) matching dollar amounts and win that amount!" It will be readily understood that although all of the bonus symbols are represented graphically in this example game as "stars," the symbols are distinguishable (in this case, by color) and may be tracked separately. Of course, it will also be understood that symbols may be distinguishable in any of various ways, such as by shape, size, color, representation, or any combination thereof (e.g., the "MUSIC MADNESS" as depicted in entries 1018, 1020, and 1021 includes both "staff" and "note" symbols). Three exemplary bonus conditions are illustrated in the example data of table 1000 in FIG. 10B for the "RED, WHITE & BLUE" game, which is identified as "G-976." Entry 1040 depicts a bonus in which a player is allowed to receive a bonus of "$25" if the player obtains three "star" symbols of the same color (i.e., three red "stars," three blue "stars," or three white "stars"). Entry 1042 depicts a bonus in which a player is allowed to receive a bonus of "$50" if the player obtains one "star" in each of the three colors (i.e., one red "star," one blue "star," and one white "star"). Entry 1044 depicts a bonus in which a player is allowed to receive a bonus of "$10" if the player obtains any color combination of three "star" symbols (e.g., two blue "stars" and one white "star").

It will be readily understood that a secondary game in accordance with some embodiments of the present invention may be provided profitably. In one example of the "RED, WHITE & BLUE" game, one in one hundred tickets includes a bonus symbol, and there is an equal number of bonus symbols of each color. If sixty thousand lottery game outcomes (bearing a total of two hundred of each color bonus symbol) are made available for purchase for $1 each, according to the exemplary data in FIG. 10B the maximum bonus payout exposure (i.e., for accumulating one symbol of each color) is (200 possible bonus redemptions)×($50 bonus)=$10,000.

Expressed as a percentage of total sales, the maximum bonus payout exposure is thus ($10,000 payout exposure)/($60,000 total sales)=16.6%.

However, given that there are three (3) separate bonus prize payouts in the illustrative example of FIG. 10B (i.e., $10, $25 and $50), the theoretical average bonus payout is $28.33 or (($50+$25+$10)/3 $28.33).

Based on a total of two hundred (200) bonus payout redemptions at a theoretical average of $28.33 each, the theoretical average bonus payout exposure is $5,666.00. Expressed as a percentage of total sales the theoretical average bonus payout exposure is thus ($5,666 average payout exposure)/($60,000 total sales)=9.443%.

If, for example, 45% of total sales are earmarked for use in providing payouts according to the primary game associated with the example of FIG. 10B, then the total payout for the primary and bonus games would range anywhere from 45% to 61.66%. Thus, the expected profitability for this example scenario would be anywhere from 39.33%-55%, or between $23,000-$33,000.

Method

A method according to one embodiment of the present invention will now be discussed, with reference to FIG. 11. Although the flowchart of FIG. 11 recites steps in a particular order, it should be understood that such order is for illustrative purposes only and changing the order of the steps would not depart from the spirit and scope of the present invention.

Figure 11:
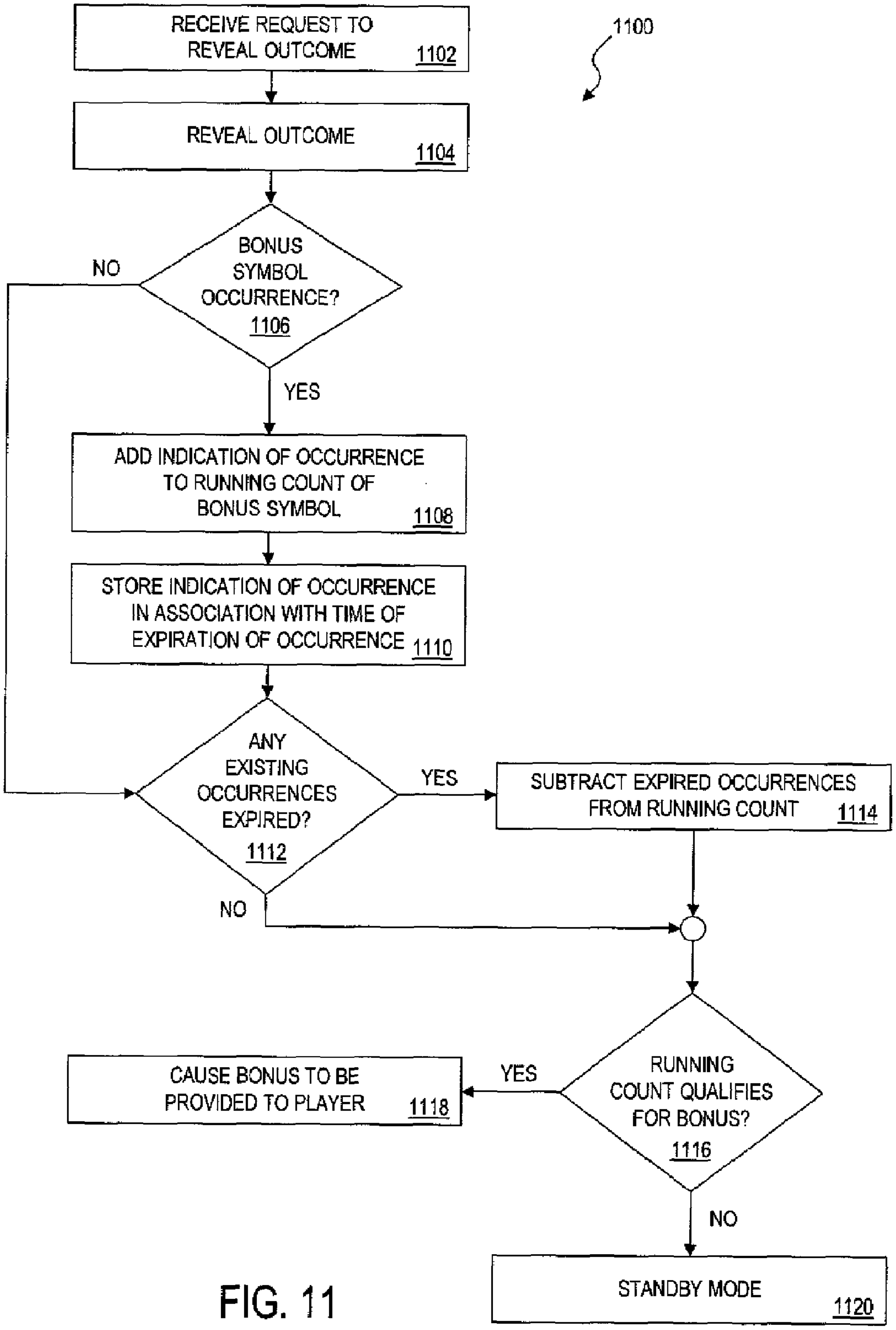
FIG. 11 is a flowchart illustrating a method in accordance with an embodiment of the present invention.

Referring now to FIG. 11, a flowchart representing a process of updating at least one running count of at least one bonus symbol in accordance with one embodiment of the present invention is illustrated. The process 1100 may be performed by (i) any of the player devices 150A, 150B, or 150C; (ii) lottery server 300; and/or (iii) a combination thereof.

The process 1100 is initiated when a request to reveal an outcome is received at step 1102. Such a request may comprise, for example, a player actuating a button on player device 250. Once the outcome is revealed to the player at step 1104 (e.g. via output device 260, FIG. 2), it is determined whether the outcome includes or is associated with an occurrence of a bonus symbol (step 1106). Such a determination may be performed by accessing table 400 and determining, based on the game identifier of the game currently being played, whether any of the designated bonus symbols have been revealed to the player.

If it is determined in step 1106 that an occurrence of a bonus symbol is included in or associated with the revealed outcome, the running count of the bonus symbol is updated to reflect this occurrence (step 1108). For example, the bonus symbol occurrence meter(s) 282 (FIG. 2) may be accessed and the number of occurrences of the bonus symbol contained in or associated with the outcome may be increased based on the number of occurrences of the symbol revealed to the player. An indication of the occurrence of the bonus symbol and the time of expiration of the occurrence is stored at step 1110. For example, record 700 may be accessed, a unique occurrence identifier assigned to the outcome, and an expiration time determined based on expiration criterion associated with (i) the symbol, (ii) the lottery game, (iii) the occurrence of the symbol, (iv) the player device, and/or (v) the player. The process 1100 then continues to step 1112.

If it is determined in step 1106 that an occurrence of a bonus symbol is not included in or associated with the revealed outcome, the process 1100 continues to step 1112, discussed below.

Step 1112 comprises a determination of whether any of the occurrences currently qualifying for a bonus have expired. Such a determination may comprise, for example, accessing record 700, comparing the current time 750 to the expiration time 708 of each occurrence whose corresponding status is "active", and adjusting the status to "expired" of each occurrence for which the current time 750 is past the expiration time 708.

Any expired occurrences are then subtracted from the running count of occurrences of the respective bonus symbol (step 1114). Step 1114 may comprise, for example, accessing bonus symbol occurrence meter(s) 282 and decreasing the running count of occurrences corresponding to each respective expired bonus symbol occurrence by the number of expired occurrences. The process 1100 then continues to step 1116.

If it is determined in step 1112 that no occurrences of bonus symbols have expired the process 1100 continues to step 1116. In step 1116 it is determined whether the running count of occurrences of any tracked bonus symbol qualifies for a bonus. Such a determination may be made, for example, by accessing table 1000 and determining whether the running count of occurrences of a respective bonus symbol is at least equal to the number required 1008 of the bonus symbol. If the running count is at least equal to the number required 1008, a bonus is provided to the player associated with the running count in step 1118. Step 1118 may comprise determining what bonus to provide to the player by accessing table 1000 and determining what bonus 1010 corresponds to the number required 1008. The process 1100 then continues to step 1120.

If it is determined in step 1116 that a ruing count of occurrences of a bonus symbol does not qualify for a bonus, the process continues to step 1120. Step 1120 comprises a standby mode in which player device 150A, 150B, 150C, or lottery server 300 may remain for purposes of process 1100 until, e.g., a request to reveal an outcome is received and the process 1100 is once again initiated.

Multi-Player Embodiments

The scope of the present invention encompasses embodiments in which the occurrences of a bonus symbol are accumulated in a running count that may be incremented based on occurrences of a respective symbol as obtained by multiple players. Such multiple players may obtain the occurrences of bonus symbols on one player device or on multiple player devices (e.g. each player may play on a separate player device). In such embodiments the combined running count of occurrences of a bonus symbol may be tracked (i) on each of the player devices, (ii) on one of the player devices, and/or (iii) on the lottery server 300. Such multiple player devices may be communicated directly (e.g. via communication link 115) or via lottery server 300 and may be remote from each other or located in essentially the same location.

For example, several players may join to play as a team and together attempt to accumulated one hundred (100) "cash" bonus symbols. Thus, each time one of the players on the team reveals an outcome that contains or is associated with a bonus symbol, the running count of occurrence of the bonus symbol for that team may be increased. Such team-obtained occurrences may expire based on expiration criterion, as discussed above.

In another example of a multi-player embodiment each player associated with a team may be associated with a respective running count of occurrences of a bonus symbol as revealed by that player, but that player's running count may be otherwise affected by the activity of other players on the team. For example, the running count of occurrences of a bonus symbol associated with a respective player may be decreased based on the occurrence of a predetermined symbol on another player's device.

In yet another multi-player embodiment, players may compete against one another for a bonus. For example, the first player on a team to accumulated twenty (20) "cash" symbols may win a bonus.

Players may register for a team with lottery server 300. In such embodiments lottery server 300 may store the player identifier of each player on a team in association with a team identifier. Players may request to be on a team with specific other players or lottery server 300 may organize players into teams.

ADDITIONAL EMBODIMENTS

According to some embodiments of the present invention, a bonus prize pool may be allocated in variable portions to players who qualify. For instance, not every player who satisfies the same bonus condition (e.g., accumulates five "cherry" symbols) may receive the same bonus. In one example, a player who requests to redeem his bonus earlier will receive a larger share of the bonus prize pool than a player who redeems later. Thus, players who redeem earlier in the game will win a greater share of the available pool. In another example, a qualifying player who purchased his lottery outcomes earlier will receive a larger share than a qualifying player who purchased his outcomes later. Thus, players who make purchases earlier will win a greater share of the available prize pool. By basing bonus prize values on time in this way, a lottery operator may encourage early adoption of a game and/or redemption of prizes.

As discussed above, multiple types of symbols may be tracked for a particular game. Symbols may be differentiated by their color, shape, size, etc. In some embodiments, symbols may be distinguished (additionally or alternatively) based on different types of tickets that may be played in the game. In one example, a state lottery may make electronic and/or physical tickets for a game available in multiple formats or styles. For instance, a state lottery may issue sixty thousand $1 tickets, of which twenty thousand are designated as "red" tickets, twenty thousand are designated as "white" tickets, and twenty thousand are designated as "blue" tickets. The physical tickets may be distinguishable based on their graphic design (e.g., the word "RED" appears on a "red" ticket), paper stock (e.g., "blue" tickets are printed on blue paper stock), or by some other means. In an electronic version, for example, a player device may represent a purchased "blue" ticket using a blue display background, by displaying the word "BLUE" on the device display, or by some other means. In this way, bonus symbols may be distinguishable based on the type of ticket on which they appear.

In embodiments of the present invention that use physical tickets for distributing lottery game outcomes (in addition to or in lieu of electronic lottery game outcomes), occurrences of symbols may be tracked by a lottery server and/or POS terminal in one or more of the varied ways discussed above. For example, upon generation or purchase of a physical ticket, a record corresponding to the ticket may be stored in an outcome database. Optionally, a lottery sale terminal or other type of POS terminal may transmit information about the player (e.g., a player ID) and/or a purchased ticket to a lottery server, which may store the player information in association with the particular outcome (e.g., as may be identified by a ticket number or other outcome identifier). Such information may be used to track occurrences of tracked symbols for that player, as discussed herein.

In some embodiments, after revealing an outcome on a physical ticket (e.g., by scratching off a covering latex portion), a player may present the ticket at a POS terminal, kiosk, or other type of player device. At a POS terminal, for instance, a clerk or player may scan a bar code or other machine-readable outcome or ticket identifier on the ticket, or may enter a printed corresponding outcome or ticket identifier into the POS terminal using some other means (e.g. by entering it using a keypad). The outcome identifier and/or ticket identifier may be sent to the lottery server and/or stored at the POS terminal and may be used to identify any associated bonus symbol(s) (e.g., as recorded in an outcome database) for tracking (e.g., in an occurrence meter). Alternatively, only indications of the bonus symbols themselves may be transmitted for tracking purposes (e.g., the clerk inputs an indication that the presented ticket shows a blue "star" symbol). In some embodiments, physical tickets may be presented at a POS terminal or otherwise provided to a lottery retailer for redemption. The lottery retailer may then submit presented tickets in batch for validation by the lottery authority, as will be readily understood by those skilled in the art. Some embodiments discussed in the present disclosure may be associated with instant lottery games. In some alternative embodiments, play of a secondary game may be provided for in association with a game in which numbers are drawn and a player's number picks (e.g., particular numbers selected by the player, numbers selected at random) are compared to the numbers drawn (e.g., a standard "6/49" lottery or other drawing game). In such embodiments, the number of times that any number on a player's lottery entry (e.g., lottery ticket) matches a drawn number may be tracked in a manner analogous to that of the number of occurrences of bonus symbols, as discussed above. In this way, a secondary game may be provided that allows for a player to earn bonuses for making lottery number matches over a plurality of drawings and/or tickets.

For example, a numbers matching game in accordance with the present invention might allow a player to win a $5 bonus payout if the player is able to match any fifteen numbers drawn in a particular calendar month, regardless of the number of tickets required to match the fifteen drawn numbers. Though not required, it might be preferred to have the secondary game limited to numbers matched by a player; from only one ticket for each drawing (or limited to some other number of tickets per drawing). For instance, if the player matches numbers on two tickets in the same drawing, only the matching of number(s) from one of the tickets would be reflected in a running count of matched numbers for the bonus game. In another example of a bonus, a player may be allowed a bonus of three free tickets if the player accumulates fifty matches over any amount of time and/or number of drawings. In yet another example bonus for a numbers game, a player may be eligible for a bonus if the player has five tickets, each having matched the lowest drawn number for the respective drawing. In one variation of this example, all such matching tickets must have been purchased within a particular time period (e.g., thirty days). Thus, aspects of the present invention may be implemented for various types of lottery numbers games, including standard "6/49" lotteries and daily drawing games, by tracking the number of times a player matches drawn numbers over a plurality of drawings and/or tickets.

Some embodiments allow for bonuses to be provided based on play of different types of games. For example, a lottery authority may establish a bonus condition that requires a player to accumulate ten bonus symbols in a "MUSIC MADNESS" game and one bonus symbol in a "LUCKY SLOTS" game to earn a $3 bonus. In another example, a player may be eligible for a bonus that is based on accumulating symbols in an instant game and also requires the player to match numbers in a numbers game. Some lottery operators may find such embodiments useful in motivating players to try additional games.

According to some embodiments, a player ID may comprise a user name and/or password for a Web site (e.g., hosted by or on behalf of a lottery operator). In one embodiment, a player may access a lottery Web site and enter a ticket identifier or other type of outcome identifier. In a physical ticket embodiment, the player may enter the ticket identifiers for tickets the player has purchased. In some embodiments, the lottery server may provide information to the player about the player's progress in the secondary game (e.g., an indication of the current number of tracked symbol occurrences, an indication of the total number of matched lottery drawing numbers), via the Web site or via email, for example. In some embodiments, a player may provide a frequent player card number or other identifier when making purchases. A summary of the player's matched numbers or tracked number of bonus symbols, for example, may be provided during the purchase (e.g., on a lottery ticket, on a receipt, displayed during a Web site checkout).

According to another embodiment, bonus symbols themselves may depict a representation of an associated bonus prize. For example, where the bonus prize is merchandise, the bonus symbols may be collected to form a completed image of the merchandise or an icon representing the merchandise.

CONCLUSION

The above discussion contains several examples which illustrate various embodiments of the present invention. These examples do not constitute a definition of all possible embodiments, and those skilled in the art will understand that the present invention is applicable to many other embodiments. Further, although the above examples are briefly described for clarity, those skilled in the art will understand how to make any changes, if necessary, to the above-described apparatus and methods to accommodate these and other embodiments and applications. For example, although the tracking of occurrences of a bonus symbol has been discussed based on the time the bonus symbol is revealed to a player (e.g. as part of or in association with an outcome), other times or parameters may be used for purposes of tracking the bonus symbol. For example, the time an outcome is purchased or transmitted to a player device may be used as the starting time for purposes of calculating a time of expiration of the occurrence of the bonus symbol.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:

determining, by a lottery server comprising a processer, a total number of occurrences of a first symbol in at least two predetermined outcomes for a player in an instant lottery game, in which determining the total number of occurrences of the first symbol comprises determining, by a lottery server for each occurrence of the first symbol in the at least two predetermined outcomes for the player in the instant lottery game, a period of time of a predetermined fixed length, wherein after the respective period of time following a respective time of the occurrence, the respective occurrence expires, and determining, by a lottery server, for each occurrence of the first symbol, whether the respective period of time has passed following the respective time of the respective occurrence;

determining, by the lottery server, that the total number of occurrences of the first symbol is not less than a first minimum number of occurrences greater than one; and providing a bonus to the player in response to determining that the total number of occurrences of the first symbol in the at least two predetermined outcomes for the player is not less than the first minimum number of occurrences.

2. The method of claim 1, further comprising:

determining a total number of occurrences of a second symbol in the at least two predetermined outcomes;

determining that the total number of occurrences of the second symbol in the at least two predetermined outcomes is not less than a second minimum number of occurrences greater than one; and in which providing the bonus further comprises:

providing the bonus to the player in response to determining that the determined total number of occurrences of the second symbol is not less than the second minimum number of occurrences greater than one.

3. The method of claim 2, in which at least one of the at least two predetermined outcomes is provided on a first type of physical ticket, and in which at least one of the at least two outcomes is provided on a second type of physical ticket.

4. The method of claim 1, in which at least one of the at least two predetermined outcomes is provided on a physical ticket.

5. The method of claim 1, in which at least one of the at least two predetermined outcomes is provided electronically.

6. The method of claim 1, in which the step of determining the total number of occurrences comprises:

determining a number of occurrences of the first symbol that qualify for the bonus; and in which providing the bonus further comprises:

providing the bonus if the number of occurrences of the first symbol that qualify for the bonus is at least a minimum number of occurrences greater than one.

7. The method of claim 6, in which determining the number of occurrences of the first symbol that qualify for the bonus comprises:

determining at least one rule; and determining the number of occurrences of the first symbol that qualify for the bonus in accordance with the at least one rule.

8. A method comprising:

determining, by a lottery server comprising a processor, a total number of occurrences of a first symbol in at least two predetermined outcomes for a player in an instant lottery game;

determining, by the lottery server, that the total number of occurrences of the first symbol is not less than a first minimum number of occurrences greater than one; and providing a bonus to the player in response to determining that the total number of occurrences of the first symbol in the at least two predetermined outcomes for the player is not less than the first minimum number of occurrences, in which the step of determining the total number of occurrences comprises:

determining a number of occurrences of the first symbol that qualify for the bonus; and in which providing the bonus further comprises:

providing the bonus if the number of occurrences of the first symbol that qualify for the bonus is at least a minimum number of occurrences greater than one, in which determining the number of occurrences of the first symbol that qualify for the bonus comprises:

determining at least one rule; and determining the number of occurrences of the first symbol that qualify for the bonus in accordance with the at least one rule, in which the at least one rule comprises:

a period of time of a predetermined fixed length during which the occurrence of the first symbol qualifies for the bonus, and in which the period of time begins at a time of the occurrence of the first symbol.

9. A computer readable medium storing instructions configured to direct a computing device to perform a method, the method comprising:

determining, by a lottery server comprising a processor, a total number of occurrences of a first symbol in at least two predetermined outcomes for a player in an instant lottery game, in which determining the total number of occurrences of the first symbol comprises determining, by the lottery server for each occurrence of the first symbol in the at least two predetermined outcomes for the player in the instant lottery game, a period of time of a predetermined fixed length, wherein after the respective period of time following a respective time of the occurrence, the respective occurrence expires, and determining, by the lottery sever for each occurrence of the first symbol, whether the respective period of time has passed following the respective time of the respective occurrence;

determining, by the lottery server that the total number of occurrences of the first symbol is not less than a first minimum number of occurrences greater than one; and transmitting an indication of a bonus to be provided to the player in response to determining that the total number of occurrences of the first symbol in the at least two predetermined outcomes for the player is not less than the first minimum number of occurrences.

10. An apparatus comprising:

a processor;

an output device in communication with the processor; and a storage device in communication with the processor, the storage device storing computer-readable instructions configured to direct the processor to perform a method, the method comprising:

determining a total number of occurrences of a first symbol in at least two predetermined outcomes for a player in an instant lottery game, in which determining the total number of occurrences of the first symbol comprises determining, for each occurrence of the first symbol in the at least two predetermined outcomes for the player in the instant lottery game, a period of time of a predetermined fixed length, wherein after the respective period of time following a respective time of the occurrence, the respective occurrence expires, and determining, for each occurrence of the first symbol, whether the respective period of time has passed following the respective time of the respective occurrence;

determining that the total number of occurrences of the first symbol is not less than a first minimum number of occurrences greater than one; and transmitting via the output device an indication of a bonus to be provided to the player in response to determining that the total number of occurrences of the first symbol in the at least two predetermined outcomes for the player is not less than the first minimum number of occurrences.

* * * * *